(12) United States Patent
Kramer

(10) Patent No.: US 7,452,005 B2
(45) Date of Patent: Nov. 18, 2008

(54) DUCT SEALING APPARATUS

(75) Inventor: Jack Melvin Kramer, Vidalia, GA (US)

(73) Assignee: RCF Technologies, Inc., Vidalia, GA (US)

( * ) Notice: Subject to any disclaimer, the term of this patent is extended or adjusted under 35 U.S.C. 154(b) by 250 days.

(21) Appl. No.: 11/210,341

(22) Filed: Aug. 24, 2005

(65) Prior Publication Data

US 2007/0052230 A1      Mar. 8, 2007

(51) Int. Cl.
   *F16L 21/00*       (2006.01)
(52) U.S. Cl. .................. 285/236; 285/223; 285/364; 285/369; 285/406; 285/417; 403/312; 403/344
(58) Field of Classification Search ......... 285/235–236, 285/337, 364–365, 369, 372, 417–418, 424, 285/110–111, 223, 226; 403/310, 312, 344
   See application file for complete search history.

(56) References Cited

U.S. PATENT DOCUMENTS

| 435,927 | A | * | 9/1890 | Ginty | 138/30 |
|---|---|---|---|---|---|
| 1,797,151 | A | * | 3/1931 | Lord | 285/226 |
| 2,264,581 | A | | 12/1941 | Naylor | |
| 2,386,562 | A | | 10/1945 | Mahoney | |
| 2,670,222 | A | * | 2/1954 | Dragon | 285/6 |
| 2,712,456 | A | * | 7/1955 | McCreery | 285/145.5 |
| 3,744,825 | A | | 7/1973 | Cooper et al. | |
| 4,763,695 | A | * | 8/1988 | Dooley | 138/109 |
| 4,899,726 | A | * | 2/1990 | Waterman | 126/110 R |
| 5,261,706 | A | | 11/1993 | Bartholomew | |
| 5,323,517 | A | | 6/1994 | Su | |
| 5,547,232 | A | * | 8/1996 | Waterman | 285/236 |
| 5,865,476 | A | | 2/1999 | Kramer | |
| 6,179,339 | B1 | * | 1/2001 | Vila | 285/111 |
| 2005/0140139 | A1 | * | 6/2005 | Lundstrom | 285/337 |

* cited by examiner

*Primary Examiner*—Aaron M Dunwoody
*Assistant Examiner*—Fannie Kee
(74) *Attorney, Agent, or Firm*—Jason A. Bernstein; Charles L. Warner, II; Powell Goldstein LLP

(57) ABSTRACT

An apparatus for coupling and sealing tubes, comprising a flexible duct having a first and second end portions, each portion having an outwardly extending seal portion connected to a flat portion, which in turn is connected to an angled portion which connects to a flat portion having expanded diameter. The apparatus also comprises a sealing assembly comprising a split ring, a compression ring and an end cap subassembly which fits over the compression and split rings. The end cap subassembly comprises a pair of half-rings which are hinged together at one end and latched together using a closure mechanism at the other end. The split ring is mounted over the duct end seal after a tube with a bead is inserted inside the duct. A compression ring is fit over the split ring and the end cap subassembly is latched in place over the compression and split rings, thereby placing the duct seal portion under compressive pressure against the tube and maintaining it in place in a sealed relationship.

17 Claims, 9 Drawing Sheets

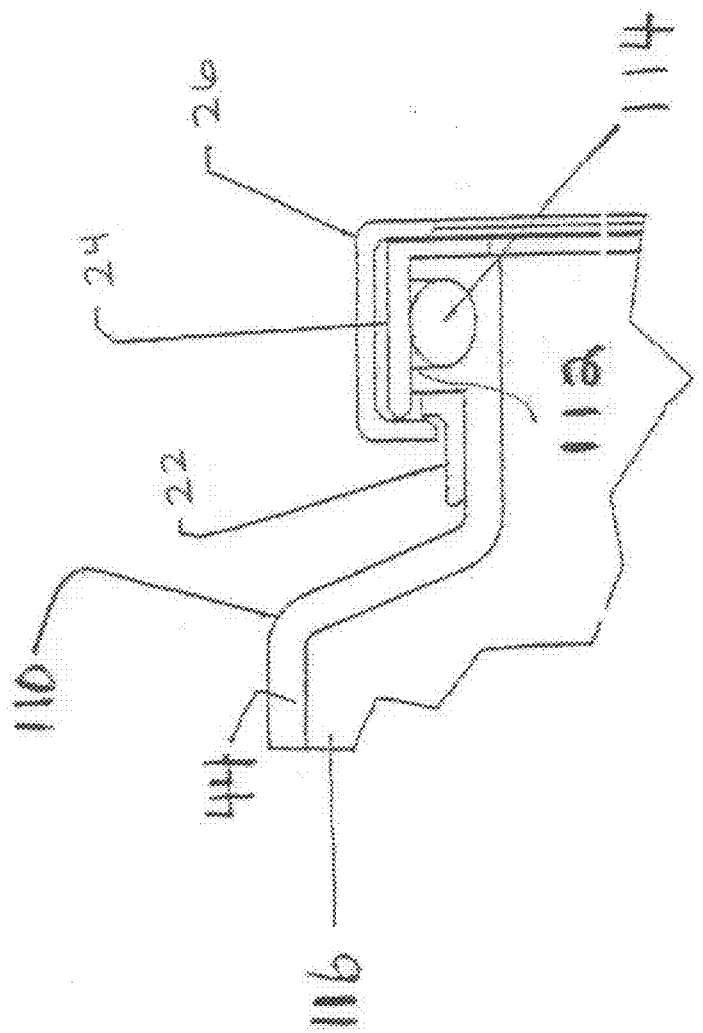

DUCT SEALING APPARATUS

FIELD OF THE INVENTION

The present invention relates to sealing systems. More particularly, the present invention relates to a flexible duct seal and compression assembly which reduces potential leakage and slippage.

BACKGROUND OF THE INVENTION

Present day flexible ducting is constructed using rubber, fabric reinforced rubber (for example, flexible ducts available from RCF Technologies, Inc., Vidalia, Ga., www.rcftechnologies.com) or flexible plastics secured to metal or rigid tubing by means of commercially available band clamps or welding. Sealing against fluid as well as against internal or external pressure and slippage are important functions of the clamp.

One typical type of band clamp consists of a metal strip with helical slots at one end. The slots slip through a worm gear located at the opposite end. The strip is wrapped around a tubular end section of the duct which has been placed over a beaded metal tube to which it is secured. The strip is fed through the worm gear and tightened until the duct is locked in place and sealed. Where higher pressures are involved, the duct may, in time, slip out from under the clamp. Hence, a bead is provided at the end of the tube to act as a stop.

As the band or strip is drawn through the worm gear and tightened, friction between it and the duct material causes the duct material to move with the strip and gather near the worm gear. This can create a leak path and many designs of band clamps have been developed to address this problem, with varying degrees of success.

It would be desirable to have a duct sealing system that would adequately address the problem of slippage and leakage. Furthermore, it would be desirable to have a sealing system that would not require manual tightening.

SUMMARY OF THE INVENTION

Generally described, the present invention provides in a first exemplary embodiment a sealing apparatus generally comprising a flexible duct and a sealing assembly. The duct comprises i) a first end having an annular first seal extending radially therefrom, the first seal having a rounded side edge, ii) a first generally flat portion extending from the first end, iii) an expanded portion having an expanded diameter extending from the generally flat portion, iv) a second generally flat portion extending from the expanded portion, and, v) a second end having an annular second flange extending radially therefrom, the second flange having a rounded side edge. The invention further comprises a sealing assembly, comprising a split ring, at least one compression ring, and an end cap assembly. The split ring comprises a ring having a gap therein. The compression ring has a rim sized to fit over the first end seal or the second end seal in a friction fit. The end cap subassembly comprises a) an end cap ring, comprising a first and second sections, each section having a first end and a second end, b) a rim extending from the end cap ring, c) a lip extending inwardly from the rim and generally parallel to the end cap ring, d) a hinge joining the first ends of the first and second sections, and, e) a closure for removably maintaining the second ends in a fixed spaced relationship.

The duct is designed so that each opening can fit over a tube having a beaded or flanged end. The apparatus of the present invention seals over the tube and allows for flexion of two tubes with respect to one another in the event of stress, expansion, vibration or the like. The end cap locks the duct over the beaded end of the tube to reduce the likelihood of the duct being pulled off the tube. The end cap secures the seal into the compression ring so that it resists pressure and vibration.

Other features and advantages of the present invention will become apparent upon reading the following detailed description of embodiments of the invention, when taken in conjunction with the appended claims.

BRIEF DESCRIPTION OF THE DRAWINGS

The invention is illustrated in the drawings in which like reference characters designate the same or similar parts throughout the figures of which:

FIG. 11 is a side elevation view of an alternative embodiment.

DETAILED DESCRIPTION OF THE INVENTION

Figure 1:
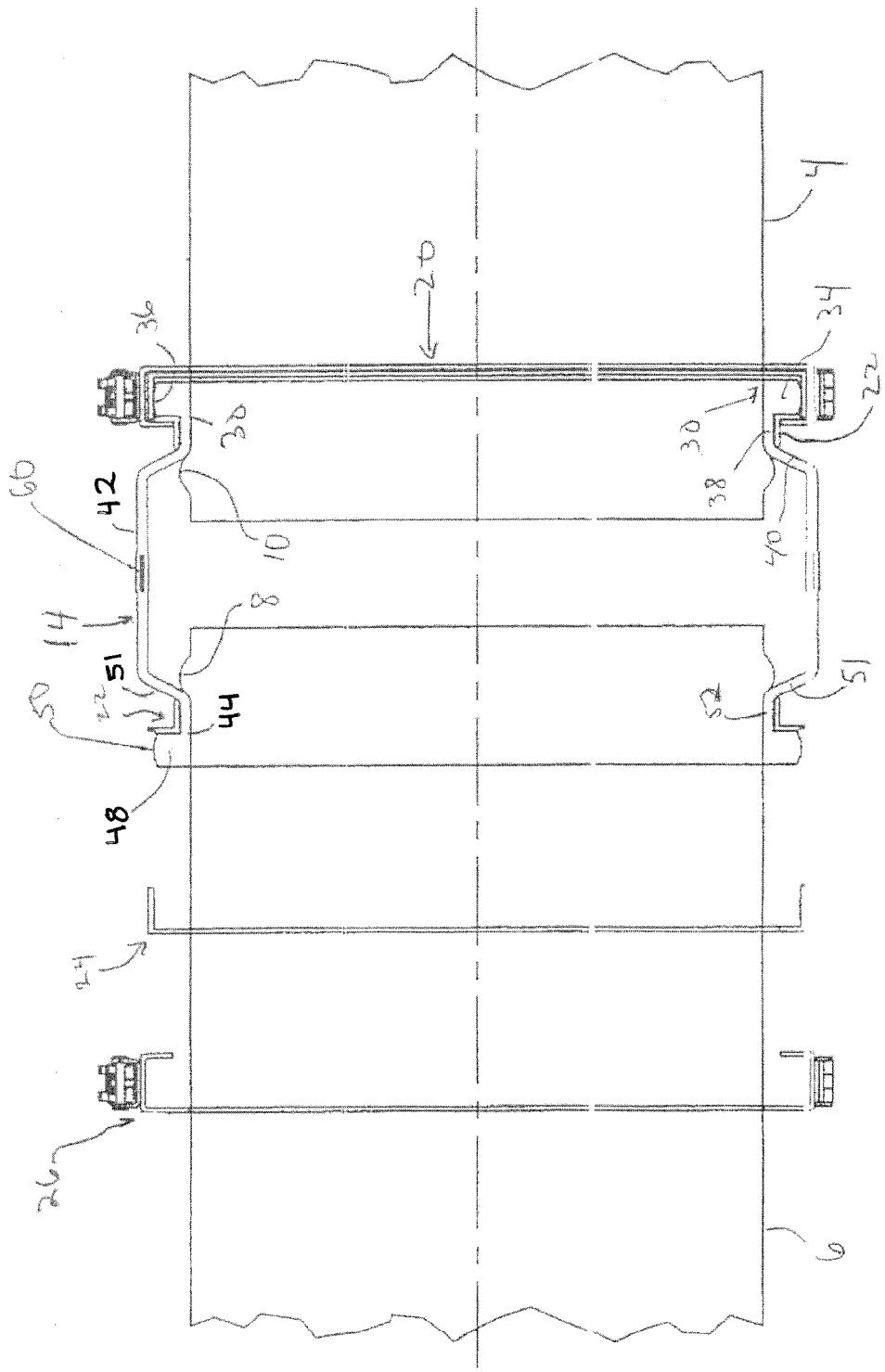
FIG. 1 is a cross-section view of one exemplary embodiment of the present invention showing a flexible duct and sealing assembly in use with a pair of conventional tubes.
Figure 2:
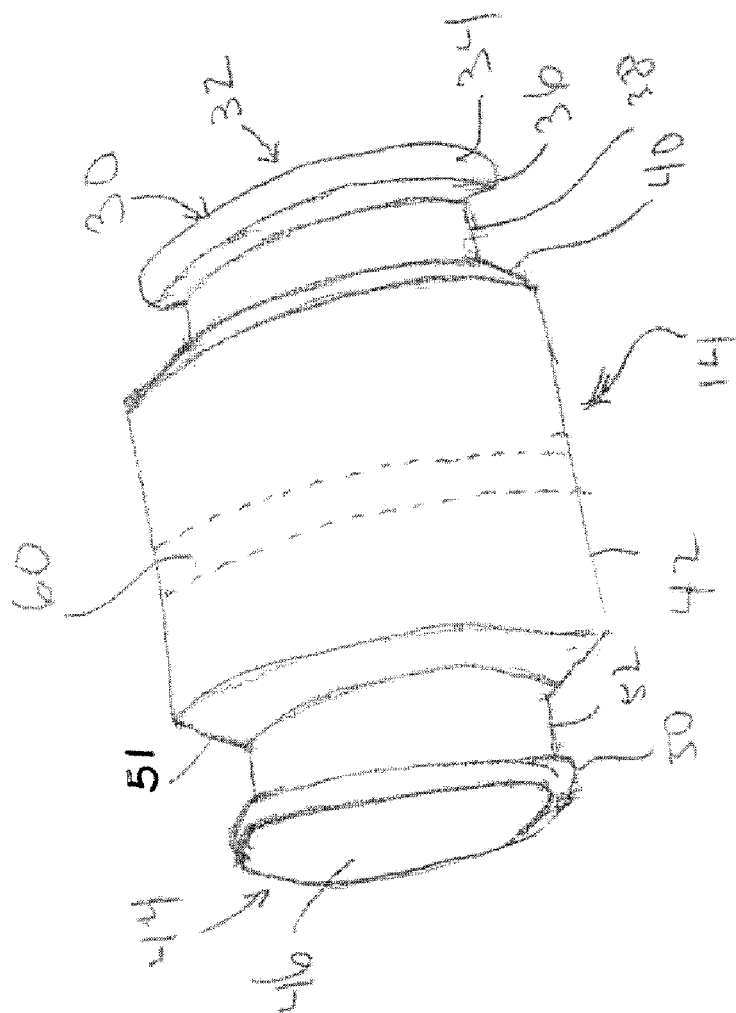
FIG. 2 is a perspective view of a duct according to one exemplary embodiment.

FIG. 1 shows a conventionally available rigid first tube 4 and second tube 6, each of which has a bead 8, 10 proximate to one end. The tube is used in many industries and is available from a number of different sources.

A flexible duct sealing apparatus according to a first exemplary embodiment of the present invention and shown in FIG. 1 generally comprises a duct 14 and a sealing assembly 20, generally comprising a split ring 22, a compression ring 24 and an end cap assembly 26. Typically, a pair of sealing assemblies 20 will be used with a single duct 14 so as to join two tubes 4, 6 together. It is contemplated as being within the scope of the present invention to adapt the duct 14 construction to have more than two openings so as to join more than two tubes together, thus employing more than two sealing assemblies 20.

The duct 14 is formed of a flexible material designed to operate at the parameters desired. A preferred duct is the RISHON® duct available from RCF Technologies, Inc., Vidalia, Ga., which is formed of multiple layers of rubberized material. It is preferable that the duct 14 be able to withstand appropriate levels of temperature, pressure or caustic material as the intended use or environment requires. The duct 14 has a first end 30 having an opening 32 sized to receive tube 4. A first sealing portion 34 having a rounded edge 36 is connected to a generally flat section 38, which in turn is connected to a beveled section 40. The beveled section 40 is connected to a generally flat middle section 42. At the opposite end of the duct 14 are second end 44, opening 46, second sealing portion 48, rounded edge 50, beveled section 51, and flat section 52, which are substantially mirror images of the correlative parts at the first end 30. It is contemplated as being within the scope of the present invention that the components at each end may be the same in size and shape, or may be different, such as when two different diameter or shaped tubes 4, 6 are to be connected. In a preferred embodiment the duct has a circular cross-sectional shape; however, other shapes, such as, but not limited to, oval, elliptical, T-shaped, elbows, involuted or the like are possible.

In one exemplary embodiment the duct 14 has a reinforcing band 60 associated with the flat section 42. The association can be such that the band 60 is on the outside of the duct 14, or, more preferably, the band 60 can be incorporated in between layers of the duct material. Where the duct is formed of two layers, the band 60 can be manufactured to be between the inner and outer walls of the material. The function of the band 60 is to provide additional reinforcement to the duct 14 when in use in high stress environments, e.g., high pressure or vacuum. The band 60 can be made of solid metal, metal mesh, wire or fabric, plastic, combinations of the foregoing, or other suitable material. It is to be understood that a plurality of bands 60 can be used, with each band 60 being parallel, crossing or overlapping with respect to a neighboring band.

Figure 3:
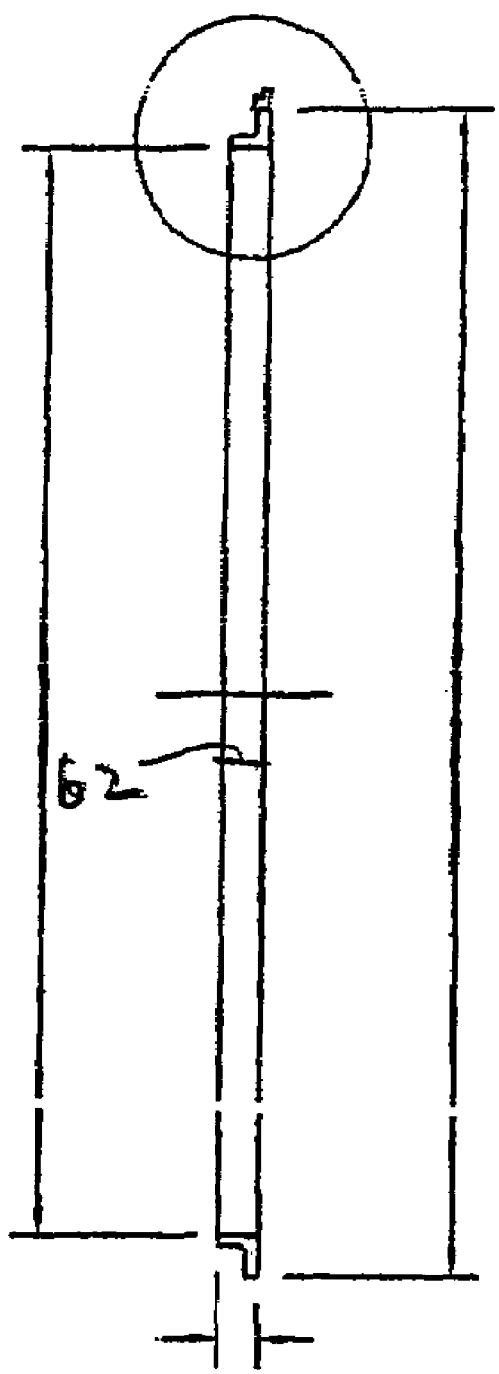
FIG. 3 is a side elevation view of an exemplary embodiment of a split ring.
Figure 4:
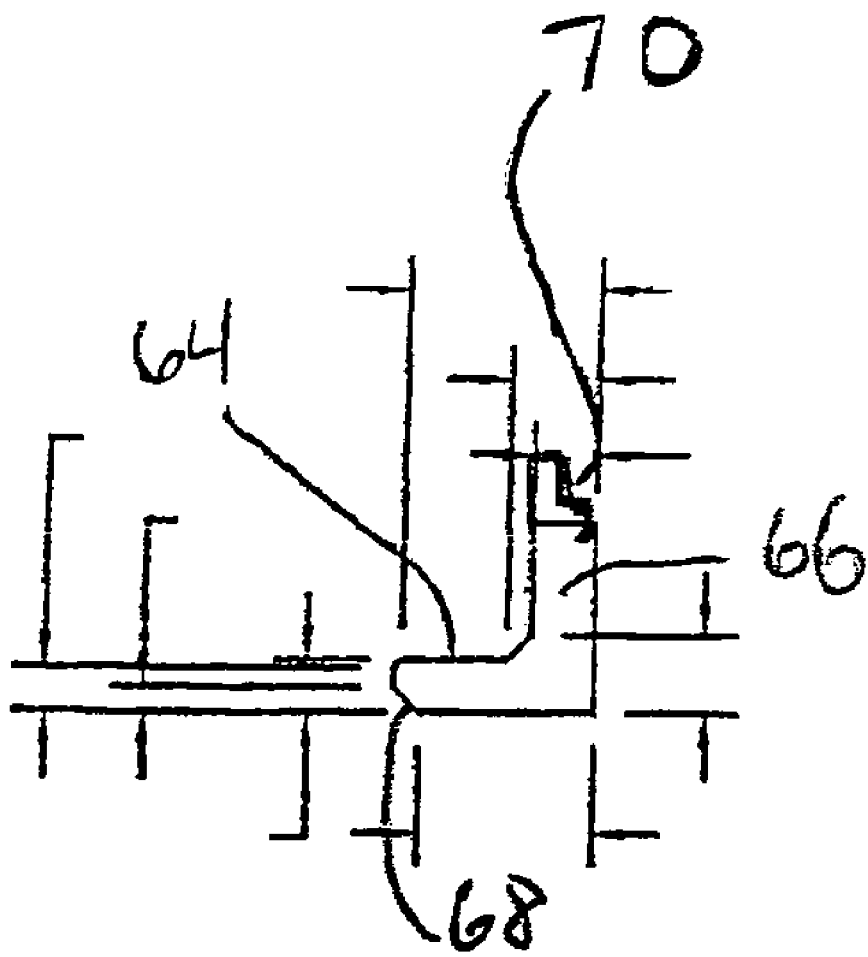
FIG. 4 is a detailed view of the edge of the split ring of FIG. 3.

FIGS. 3 and 4 show the split ring 22, which preferably comprises a single piece ring having an opening 62 which can be twisted so that ring 22 can be fit over the duct 14 and positioned around the flat section 38 or 52 (as shown in FIG. 1). FIG. 4 shows a detailed cross-section view of the rim of the ring 22, which has a lip section 64 and a flange 66. The lip 64 preferably has a beveled edge 68, which, when the ring 22 is positioned against the sealing portions 34 or 48, reduces the possibility of cuffing the duct 14. The flange 66 has a notch 70 which, as will be described in greater detail hereinbelow, mates with the compression ring 24. The height of the flange 66 preferably is approximately the same or slightly less than the height of the seal 34, 48. The ring 22 creates an interference fit with the bead, preventing slippage.

Figure 5:
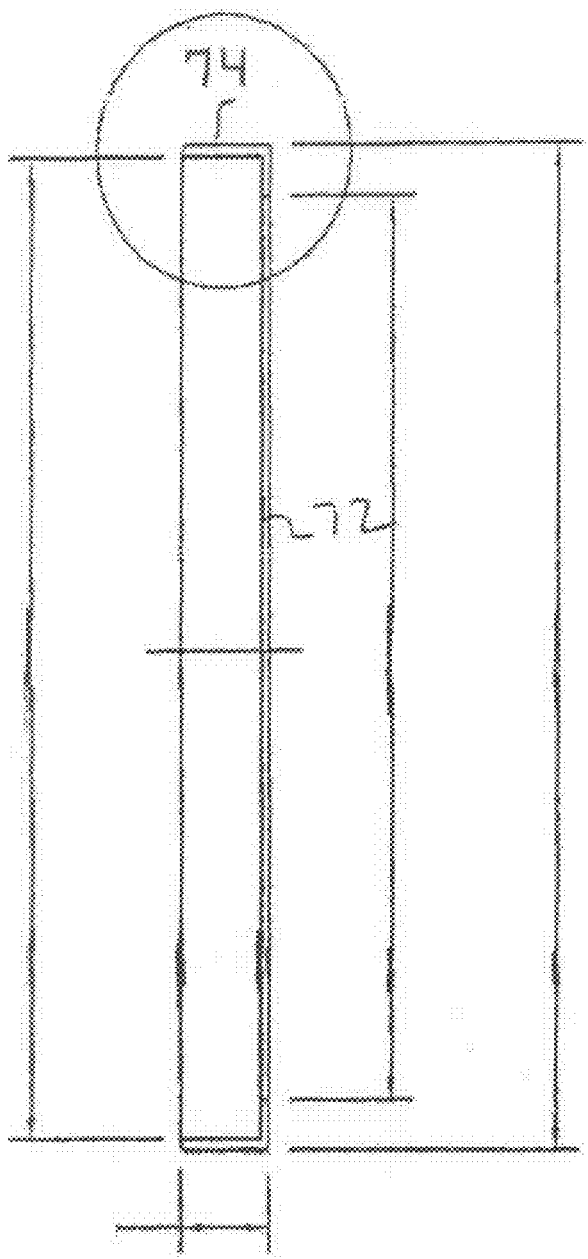
FIG. 5 is a side elevation view of an exemplary embodiment of a compression ring.
Figure 6:
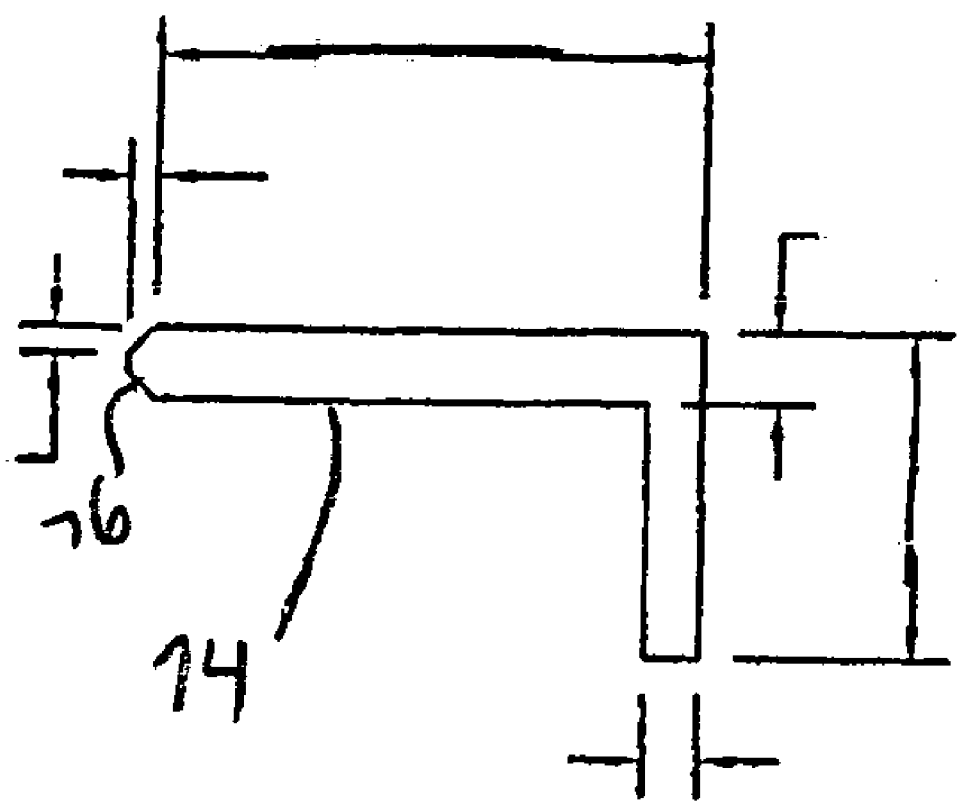
FIG. 6 is a detailed view of the edge of the compression ring of FIG. 5.

FIGS. 5 and 6 show the compression ring 24, which comprises a ring 72 having a lip 74. FIG. 6 shows a detail of the lip 74, which preferably has a beveled or rounded edge 76 which fits within the notch 70 of the split ring 22. The compression ring 24 is preferably sized to fit snugly over the sealing portions 34 or 48 of the duct 14 so as to squeeze the rounded edge 36 or 50 towards the tube 4 or 6, thereby creating a tight seal between the duct 14 and the tube 4 or 6. The split ring 22 may be eliminated for low pressure applications.

Figure 8:
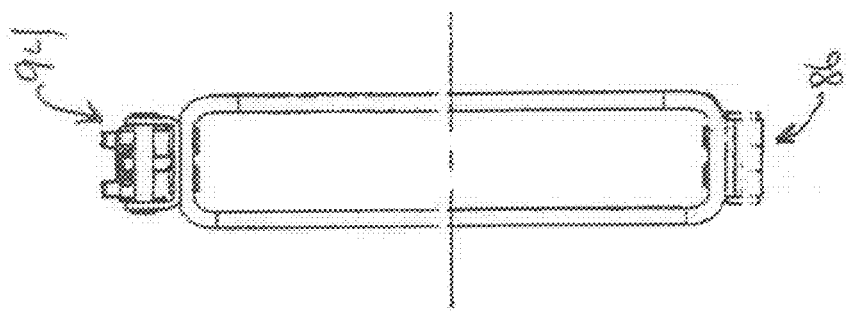
FIG. 8 is a side elevation view of the end cap subassembly of FIG. 7.
Figure 7:
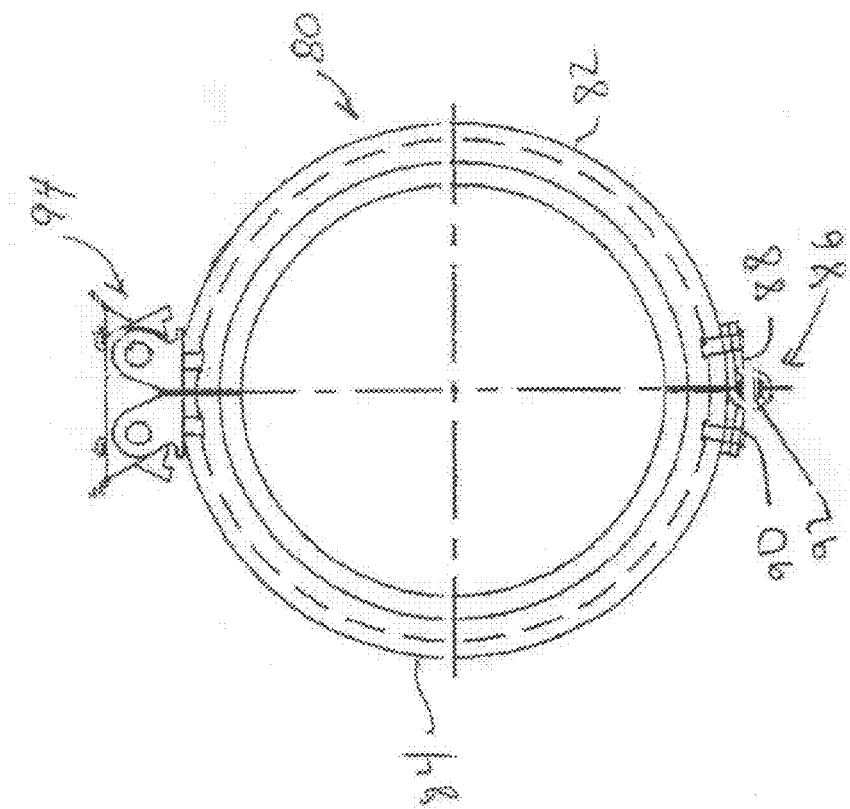
FIG. 7 is a front elevation view of one exemplary embodiment of an end cap subassembly.

FIGS 7 and 8 show one exemplary end cap subassembly 80 in which a pair of ring segments 82 and 84 are pivotably joined by a hinge 86. The hinge comprises two hinge segments 88, 90, with segment 88 being affixed to ring segment 82 and hinge segment 90 being affixed to ring segment 84. A pin 92 connects the hinge segments 88, 90. A latch or lock mechanism 94 removably joins the other ends of the ring segments 82, 84. Any suitable conventional latch or lock mechanism which can maintain the ring segments in a fixed relationship may be used with the present invention. See for example, the CENTRALOCK™ mechanism by RCF Technologies, Inc. disclosed in U.S. Pat. No. 5,865,476, the disclosure related thereto being incorporated by reference herein.

Figure 9:
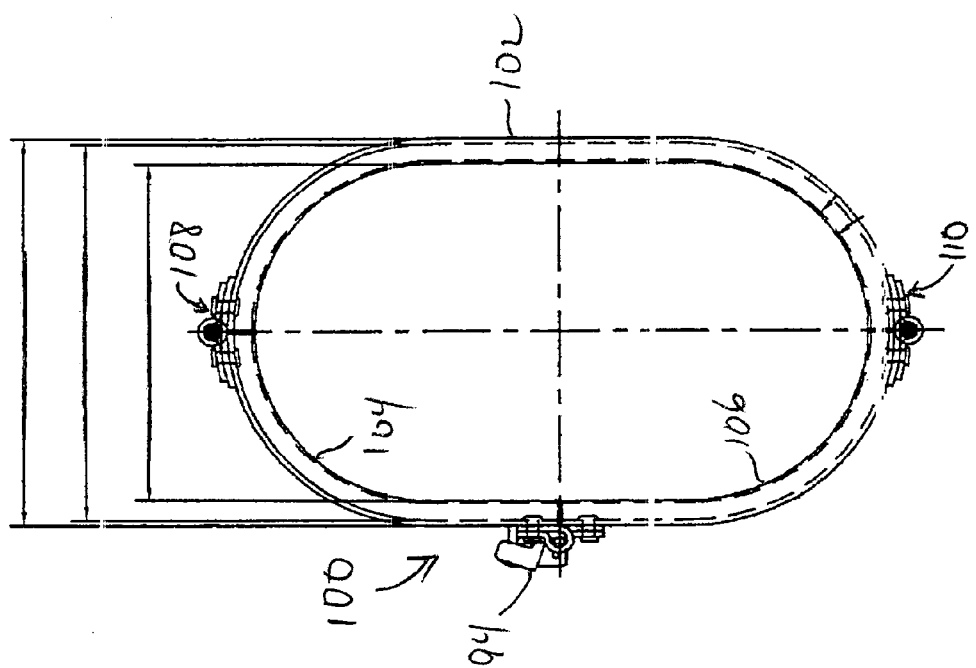
FIG. 9 is a front elevation view of an alternative exemplary embodiment of an end cap subassembly.
Figure 10:
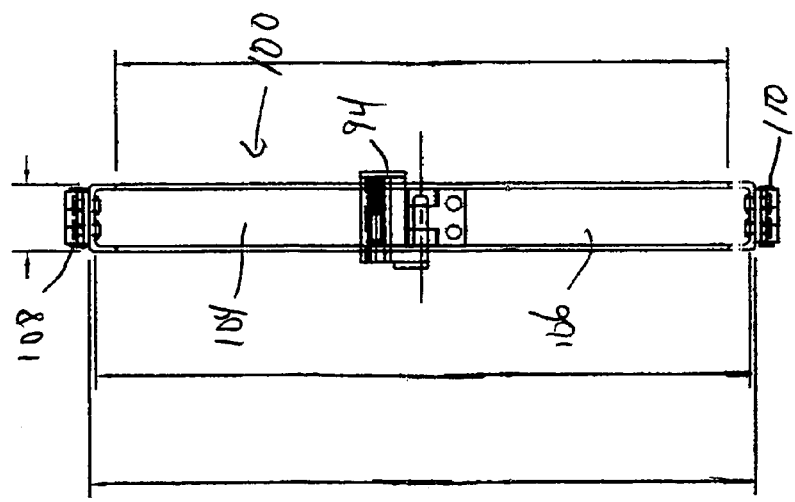
FIG. 10 is a side elevation view of the end cap subassembly of FIG. 9.

In an alternative exemplary embodiment of the end cap, shown in FIGS. 9 and 10 (as an oval shape, but circular other shapes are usable), an end cap subassembly 100 comprises a ring base segment 102, a first ring segment 104 and second ring segment 106, the ring segments 104, 106 being hingedly attached to the base segment 102 by hinges 108, 110. The hinges may be similar in design to the hinge 86. The ring segments 104 and 106 are joined together by a latch or lock mechanism 94. The end cap subassembly 100 is used in a manner similar to the end cap subassembly 80. This ring configuration is particularly well adapted for use where there is reduced clearance to open the ring segments. One exemplary embodiment of a latch mechanism 94 that can be used is shown in U.S. Pat. No. 5,865,476, the disclosure of which is incorporated herein.

In operation a tube 4 is fitted into the opening 32 of the duct 14 so that the bead 8 is inside the duct 14 and the beveled section 40. A split ring 22 is fitted over the duct 14 and placed over the flat section 38 so that the flange 66 is pointed away from the opening 32. A compression ring 24 is fitted over the split ring 22 and force fitted over the sealing portion 34. The rounded edge 36 deforms slightly, which assists in assembly and in providing a tight seal. An end cap assembly 26 (with the latch mechanism unlatched) is fitted over the compression ring 24 and the flange 66 of the split ring 22 and the latch 94 is closed and locked. The compression ring 24 presses the inside of the duct 14 against the outside of the tube 4. A second set of the split ring, compression ring and end cap subassembly are fit over the second end 44 in a similar manner. If the duct 14 is designed to have more than two openings and flanges, etc., then there is one sealing assembly 20 used for each opening.

In an alternative exemplary embodiment of the present invention the duct 14 can be modified to have two sealing assemblies 20 used at each end where additional sealing is required.

In a further alternative exemplary embodiment, shown in FIG. 11, a duct 110 is modified in that the rounded edge 36, 50 of FIG. 1 is, instead, a generally U-shaped groove 112. Either edge 36 or edge 50 or both edges can have a groove 112. The groove 112 can accommodate a conventional O-ring 114 such that when the compression ring is fit over the O-ring 114 when in the groove 112 the O-ring is partially deformed to form an elliptical cross-section shape. The end cap assembly 26 is essentially as described hereinabove. The duct 110 can be truncated (compared to the duct 14 described hereinabove) so that the second end 44 is the terminating end of the duct 110. In this configuration at least a portion of the duct 110 proximate to the second end 44, and possibly the beveled section 40 are bonded to a conventional duct 116, such as, but not limited to, rubber, solid metal, metal mesh, PVC, or the like. The second end 44 can be bonded to the duct 116 using any of various techniques know to those skilled in the art. In this manner, conventional ducting can be adapted for connection to tubes 4, 6 by being bonded to the duct 110 of the present invention. The groove 112 can be elongated to accommodate more than one O-ring 114, should several be necessary.

The present invention contemplates optimally needing only about 6-8% squeeze (particularly when using the RISHON® duct material from RCF Technologies, Inc.) to form a suitable seal, in comparison to existing sealing apparatus, which require some 18-20% squeeze. Should the tubes 4, 6 be subject to stress which attempts to pull them apart, the beads 8, 10 are abutted by the sealing portions 34, 48 of the duct 14 and are prevented from being pulled apart. Similarly, the seal between the duct 14 and tubes 4, 6 is maintained. Since the duct 14 has an inherent amount of flexion, should either or both of the tubes 4, 6 be turned, twisted, bent, vibrated, pulled, or the like, the duct 14 can accommodate such movement while maintaining the seal. The split ring 22 reduces the possibility of counterclockwise rotation of the compression ring during stress. The split ring notch 70 mates with the lip 74 of the compression ring to form a tight fit. The end cap assembly 26 eliminates the need for tightening a worm gear type clamp, which is subject to manual errors of insufficient tightening or overtightening or mispositioning, all of which can lead to leakage. The reinforcing band, while optional, helps to restrict the duct 14 against undue expansion under stress.

In another aspect the present invention provides a novel duct useful for joining two tubes, the duct being as shown and described above.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

It should further be noted that any patents, applications and publications referred to herein are incorporated by reference in their entirety.

What is claimed is:

1. A duct sealing apparatus, comprising:
   a) a connector duct, comprising
      i) a first end having an annular first sealing portion extending radially therefrom, said first sealing portion having a side edge,
      ii) a first generally flat portion extending from said first end,
      iii) an expanded portion having an expanded diameter extending from said generally flat portion,
      iv) a second generally flat portion extending from said expanded portion, and,
      v) a second end having an annular second sealing portion extending radially therefrom, said second sealing portion having a side edge,
   b) a sealing assembly, comprising
      i) a split ring, comprising a ring having a gap therein,
      ii) at least one compression ring having a rim sized to fit over said first end of said first sealing portion or said second end of said second sealing portion in a friction fit,
      iii) an end cap subassembly, comprising
         a) an end cap ring comprising a first section and a second section, each section having a first end and a second end,
         b) a rim extending from said end cap ring,
         c) a lip extending inwardly from said rim and generally parallel to said end cap ring,
         d) at least one hinge joining said sections,
         e) a closure for removably maintaining said second ends in a fixed spaced relationship
      wherein said end cap fits over said compression ring.

2. The duct sealing apparatus of claim 1, wherein at least a portion of said connector duct is flexible and is composed of a material comprising a plurality of layers of a fabric-reinforced rubber material.

3. The duct sealing apparatus of claim 2, wherein said layers are oriented such that the open ends of each layer are at generally right angles to the axis of said duct.

4. The duct sealing apparatus of claim 2, further comprising a band formed within said duct material and as part of said expanded portion.

5. The duct sealing apparatus of claim 1, further comprising a restraining band comprising a substantially flat band disposed within said generally flat portion of said duct.

6. The duct sealing apparatus of claim 1, wherein said split ring has a first portion having an edge which is at least partially beveled, and a second portion perpendicularly associated with said first portion to form an L-shaped cross section.

7. The duct sealing apparatus of claim 6, wherein said second portion of said split ring has an edge having a notch formed therein.

8. The duct sealing apparatus of claim 1, wherein said closure comprises a latch mechanism.

9. The duct sealing apparatus of claim 1, wherein at least one of said first and second sealing portions has a rounded side edge.

10. The duct sealing apparatus of claim 1, further comprising at least one O-ring sized to fit at least partially within a channel wherein at least one of said first sealing portion and said second sealing portion has a channel defined therein.

11. The duct sealing apparatus of claim 1, wherein said at least one hinge comprises a single hinge assembly comprising a first member, a second member and a pin pivotably connecting said first and second members.

12. The duct sealing apparatus of claim 1, wherein said at least one hinge comprises a plurality of hinge assemblies, each hinge assembly comprising a first member, a second member and a pin pivotably connecting said first and second members.

13. The duct sealing apparatus of claim 1, wherein at least one of said first sealing portion side edge and said second sealing portion side edge has a channel formed therein.

14. The duct sealing apparatus of claim 13, further comprising at least one O-ring adapted to fit at least partially within said side edge channel.

15. The duct sealing apparatus of claim 1, wherein said end cap ring comprises a first section, a second section and a third section, said first section being connected to said second section by a first hinge, said second section being connected to said third section by a second hinge and said third section being connectable to said first section by a fastener.

16. The duct sealing apparatus of claim 1, further comprising:
   a) a first conduit having a first end and a second end, said first end having a raised annular portion proximate thereto; and,
   b) a second conduit having a first end and a second end, said first end having a raised annular portion proximate thereto,
   wherein said first end of said connector duct is adapted to fit over said first end of said first conduit and said first conduit first end annular portion and wherein said second end of said connector duct is adapted to fit over said first end of said second conduit and said second conduit first end annular portion, and
   wherein said sealing assembly is adapted to fit over said first conduit and said connector duct first end such that said split ring fits over said connector duct first end, said compression ring fits over said split ring and said end cap assembly fits over and engages said compression ring and said sealing assembly can be locked in place to form a fluid tight seal between said first conduit first end and said connector duct first end.

17. A sealing assembly for connecting and sealing two conduit segments having a first end seal and a second end seal, said sealing assembly comprising:
   a) a split ring, comprising a ring having a gap therein;
   b) at least one compression ring having a rim sized to fit over said first end seal or said second end seal in a friction fit; and,
   c) an end cap subassembly, comprising
      i) an end cap ring, comprising a first section and a second section, each section having a first end and a second end,
      ii) a rim extending from said end cap ring,
      iii) a lip extending inwardly from said rim and generally parallel to said end cap ring,
      iv) at least one hinge joining said sections, and,
      v) a closure for removably maintaining said second ends in a fixed spaced relationship.

* * * * *